April 14, 1953   L. D. BAYLEY   2,634,834
WINDOW TAB AND GLAZING ANCHORING MEANS
Filed April 23, 1949   2 SHEETS—SHEET 1
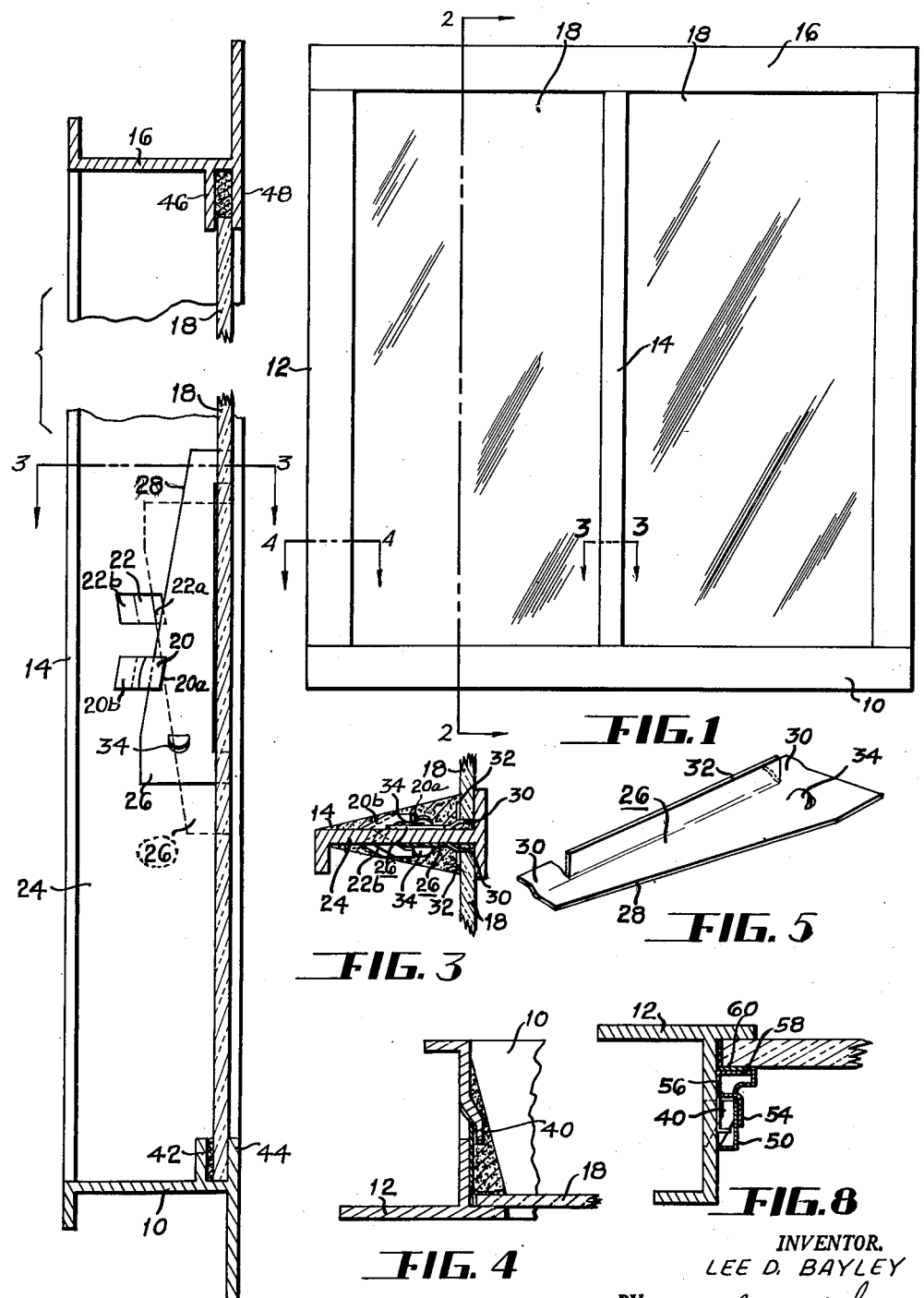
INVENTOR.
LEE D. BAYLEY
BY
HIS ATTORNEYS

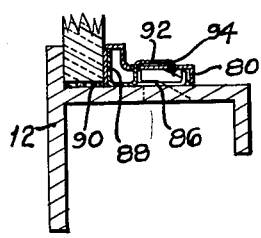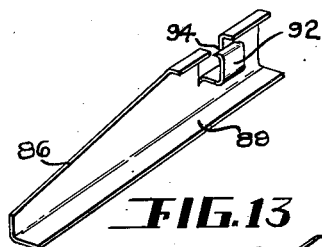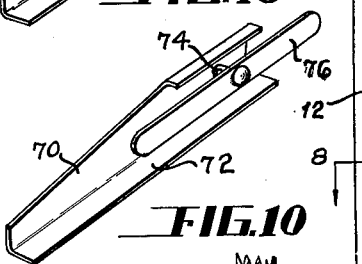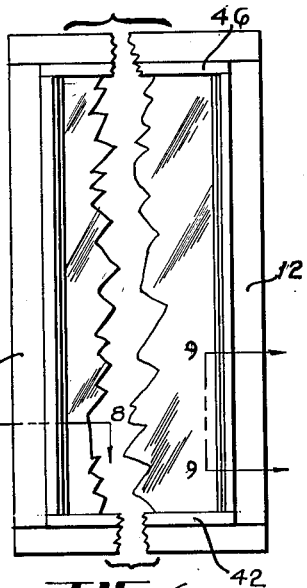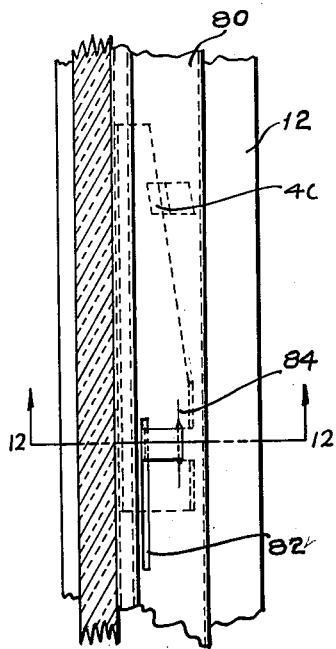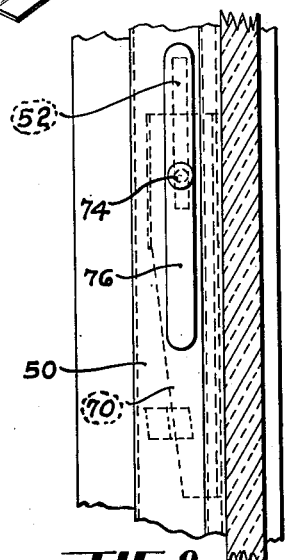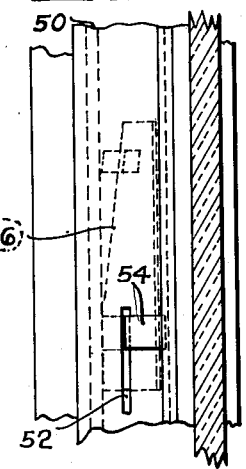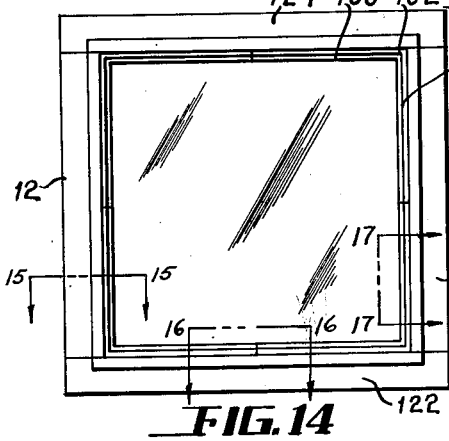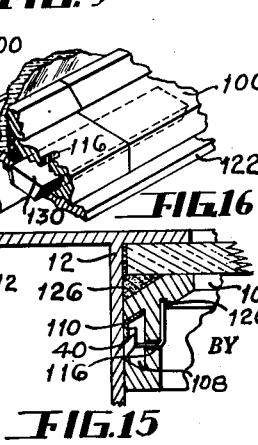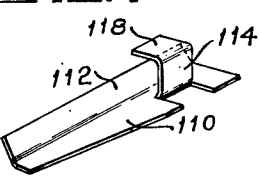

Patented Apr. 14, 1953

2,634,834

UNITED STATES PATENT OFFICE 2,634,834

WINDOW TAB AND GLAZING ANCHORING MEANS

Lee D. Bayley, Springfield, Ohio

Application April 23, 1949, Serial No. 89,176

2 Claims. (Cl. 189—78)

This invention relates to a window tab and anchoring means for glazing and more particularly as applicable to metallic windows, although not necessarily so limited.

An object of this invention is to provide glazing anchoring means that is dependable, but at the same time, inexpensive from the standpoint of material used and from the standpoint of labor required in inserting the glazing. Furthermore, if it becomes necessary to reglaze the window, the anchoring means is very convenient and efficient, in that no screws, no bolts and no rivets are used, as is the practice in many types of windows now appearing on the market. This has been accomplished by forming tabs and abutments in the metallic window frame, which tabs and abutments provide seats for wedge-shaped members adapted to have tongues abutting the edges of the glazing and provided with flanges parallel to and either in contact with or in close proximity to the plane of the glazing, the wedge-shaped members forming a substantially non-yieldable anchor that is sufficiently strong to withstand heavy wind pressures or loads.

A further object of this invention is to provide tabs and abutments integral with the metallic window frame associated with anchors for anchoring the glazing, the anchors being attached to beads extending along the edge of the window in such a manner that the anchor or wedge is housed within the bead but may be adjusted from the outside of the bead.

Other objects and advantages reside in the construction of parts, the combination thereof and the mode of operation, as will become more apparent from the following description.

Referring to the drawings, Figure 1 is a front elevational view of a window used in illustrating the invention.

Figure 2 is an enlarged cross sectional view, taken substantially on the line 2—2 of Figure 1, with parts broken away.

Figure 3 is a fragmentary, cross sectional view, taken substantially on the line 3—3 of Figures 1 and 2.

Figure 4 is an enlarged, fragmentary, cross sectional view, taken substantially on the line 4—4 of Figure 1.

Figure 5 is a perspective view of a wedge for use in anchoring the glazing.

Figure 6 is a front elevational view of a modification.

Figure 7 discloses a cross sectional view of a modified type of anchoring wedge and bead.

Figure 8 is a fragmentary, cross sectional view, taken substantially on the line 8—8 of Figure 6.

Figure 9 is a fragmentary, cross sectional view, taken substantially on the line 9—9 of Figure 6.

Figure 10 is a perspective view of a wedge for use with a bead and for anchoring the glazing.

Figure 11 is a cross sectional view of another modification.

Figure 12 is a fragmentary, cross sectional view, taken substantially on the line 12—12 of Figure 11.

Figure 13 is a perspective view of the wedge shown in Figures 11 and 12.

Figure 14 discloses another modification.

Figure 15 is a fragmentary, cross sectional view, taken substantially on the line 15—15 of Figure 14.

Figure 16 is a fragmentary, perspective view of a portion located in the vicinity of the line 16—16 of Figure 14.

Figure 17 discloses a wedge located in the vicinity of line 17—17 of Figure 14.

In the drawings, the reference character 10 indicates the sill of a window, provided with side rails or side frame members 12, a muntin bar 14 and a top frame member 16. The window is glazed by a pair of window panes 18. The lay-out of the window has been shown merely for the purpose of illustration. Any suitable type of frame members and any suitable type of muntin bars may be used for dividing the window into as many spaces as may be desirable. For the sake of simplicity, only two window panes have been shown.

As may best be seen by referring to Figures 2 and 3, the muntin bar 14 has been provided with tabs 20 and 22. The tabs 20 and 22 have been struck out of the web 24 of the muntin bar 14. The edges 20a and 22a of the tabs 20 and 22 nearest the glazing are diagonally disposed, as clearly shown in Figure 2. Furthermore, as may be clearly seen in Figure 2, the angle of inclination of the edge 20a is opposite to that of the edge 22a. The tabs 20 and 22 are arranged in spaced relation from the web 24. Furthermore, it is to be noted that the thickness of the tabs 20 and 22 is considerably less than the thickness of the web 24. This reduction in thickness has been accomplished by the use of a die used in striking the tabs out of the web. The diagonal portions 20b and 22b provide shoulders against which wedges 26 are seated. The diagonally disposed portions 20b and 22b are provided with diagonally disposed abutting surfaces extending parallel to the bevelled or inclined edge 28 of the wedge 26. This results in a seat for the inclined edge 28 that extends throughout the width of the tabs 20 or 22, as the case may be. The wedge 26 is provided with a pair of tongues 30, one at either end, that resiliently engage the edge of the glazing. Each of the wedges 26 is provided with an abutting or anchoring flange 32 lying against the glazing 18. A small tab or tongue 34 is struck out from the main body of the wedge 26, against which a tool may be applied when inserting the wedge, as will be described more fully later.

It is to be noted that the tab 20 is located on one side of the muntin bar 14 and the tab 22 is located on the opposite side of the muntin bar. There are preferably two or more pairs of tabs 20 and 22 for each muntin bar, one pair being located near the bottom, as shown in Figure 2, and one pair being located near the top of the muntin bar, which latter pair has not been shown for the sake of convenience. For large windows, one or more pairs of tabs may be located between the pairs located near the ends of the muntin bar.

The side frame members 12 are also provided with tabs 40, identical to the tabs 20 and 22. There is at least one tab near the bottom and one tab near the top of each side frame member unless the window pane is very small. In large windows more tabs may be provided as the need demands.

In the particular modification disclosed in Figures 1 and 2, no tabs have been provided in the sill member 10 and in the top frame member 16. Instead, the sill member 10 has been provided with an upwardly directed flange 42 parallel to a flange 44. The top frame member has been provided with downwardly directed flanges 46 and 48. The flanges 42 and 44 cooperate with the main body of the sill member to provide a glazing channel. Likewise, a channel is located between the top flanges 46 and 48. It is to be noted that the width of the flanges 42 and 44 is less than the width of the flanges 46 and 48. Thus, the channel between the flanges 42 and 44 is shallower than the channel between the flanges 46 and 48.

Before glazing, putty or any other suitable mastic is placed in the channels and along the side margins of the window to provide weather-proofing and water seal. This permits the insertion of the glazing 18 by first projecting the glazing upwardly into the channel between the flanges 46 and 48, then slipping the glazing over the top of the flange 42 into the channel found between the flanges 42 and 44. The glazing is then permitted to drop so as to rest between the flanges 42 and 44. However, the depth of the channel found between the flanges 42 and 44 is such that when the glazing rests in the bottom of the channel, the top edge of the glazing 18 is located between the flanges 46 and 48. That being the case, there is no necessity for anchoring members or wedges along the top and the bottom of the window in the particular modification disclosed herein.

After the window has been inserted into the two channels, one along the bottom and one along the top of the window, the wedges 26 are inserted in the proper angular relation under the tabs 20, 22 and 40. When inserting these wedges 26, the tongues 30 are projected between the outer margin of the glazing and the adjacent frame member or muntin bar, as the case may be. This tends to center the glazing and provide a lateral resilient mounting. The wedges are then tightened by an implement or tool, such as a screw driver, pliers, the claw of a hammer, a putty knife, or for that matter, a nail or any other suitable tool that may be available.

After the glazing of the window panes has been positioned and the wedges 26 forced into home position, putty or mastic is then used to seal the glazing throughout the entire periphery. This putty, in addition to sealing the glazing and providing a weather-tight window, functions to lock or hold the wedges in position. Furthermore, the putty or mastic may be used to completely conceal the wedges.

Some architects and builders prefer to use a metallic bead along the margins of the glazing. In the modification disclosed in the remaining figures, namely, Figures 6 to 17, provision has been made for the use of beads in association with the tabs described above and wedges adapted for use with such beads, which beads and wedges will now be described.

In the modification disclosed in Figure 7, a vertically disposed bead 50 extends along the vertical margins of the glazing. In Figure 8 a cross sectional view of the bead 50 has been shown. The bead is provided with a vertically disposed slot 52 receiving a tongue 54 located on the outside of the bead. This tongue 54 is integral with the wedge 56, similar to the wedge disclosed in connection with the wedge of preferred embodiment. The flange 58 of the wedge 56 engages a flange 60 integral with the bead 50. The wedge engages a tab 40 integral with the side frame member 12 or a tab 20 or 22 in the muntin bar 14 in the event a muntin bar is used. The wedge 56 is pried into position through the flange 54. As best seen in Figure 6, no bead extends across the bottom and across the top of the window, in that the bottom and the top may be provided with flanges 42, 44, 46 and 48, identical to the flanges disclosed in the preferred embodiment.

In the modification disclosed in Figures 9 and 10, an identical bead 50 has been used, provided with a slot 52. A wedge 70 is mounted within the bead. This wedge 70 is provided with a flange 72 engaging the flange 60 of the bead 50. A rivet or stud 74, secured to the wedge 70, supports an elongated washer or cover 76 located on the outside of the bead and overlying the slot 52 so as to conceal the slot. The wedge is forced into home position by a suitable tool or instrument engaging the head of the rivet or stud 74. In the modification disclosed in Figures 6 to 9 inclusive, the wedges are held in position by friction. In the modification disclosed in Figures 11, 12 and 13, the wedges are locked in position. In this modification, a bead 80 is provided with a slot 82 comparing to the slot 52 in the beads described above. The bead 80, in addition to the slot 82, is provided with a slit 84 that is normally closed. A wedge 86 is housed within the bead and adapted to engage a suitable tab, such as the tab 40 integral with the side rail member 12. The wedge 86 is provided with a tab 88 abutting a flange 90 of the bead 80 in a manner similar to that described in connection with the bead previously described. The wedge 86 is provided with a tongue 92, having a reentrant flange 96 provided with a sharpened edge 94. The tongue 92 is preferably positioned in such a manner that the reentrant flange 96 is out of contact with the bead 80 before the bead is mounted in position. When the bead is inserted in position, the wedge 86 is forced in home position by a suitable tool or implement, or manually, actuating the tongue 92. When the wedge 86 has been forced into home position, the sharpened edge 94 of the reentrant flange 96 is pressed or forced into the slit 84.

In view of the fact that the beads and the parts associated therewith are preferably made from aluminum, it can readily be seen that it will be an easy matter to force the sharpened edge 94 of the reentrant flange 96 into the slit 84. The metal engaging the reentrant flange is deflected inwardly a slight distance and it is a characteristic of aluminum that abutting edges gall very easily, so as to lock the parts in position. Thus, the tab is locked in position. Furthermore, the reentrant flange 96 prevents the wedge from becoming dislodged.

Referring to the modification disclosed in Figure 15, extruded or rolled beads 100 have been used. These beads have been mitred or jointed at 102 in the corners. The beads may be referred to as corner beads, in that each bead covers the margin of one-half of the horizontal width of the glass and one-half of the vertical height of the glass. These beads have been provided with a dovetail slot 108. A wedge 110 is mounted in the dovetail slot 108. The wedge 110, which is shown in perspective in Figure 17, is provided with a diagonally disposed flange portion 112 seated against one margin of the dovetail slot 108. A tongue 114 projects through a slot 116 in the bottom of the dovetail slot and merges into a flange 118 that is positioned in the groove 120 in member 100. This groove prevents displacement of the flange 118. The wedge may be forced into home position by engaging the flange 118, so as to cause the wedge to engage the tab 40 in member 12. The sill member 122 has also been provided with tabs 40. So has the top frame member 124. The bead 100 is provided with a bevelled edge 126, providing a cavity for putty or a mastic for sealing the bead in position.

A dovetailed shaped aligning member 130 extends across the joint formed between adjacent bead members, so as to maintain the ends of the bead members in alignment with each other. Member 130 is positioned in one of the bead members when the beads are placed in position. Then, as soon as the beads have been aligned, member 130 is shoved into the dovetailed slot in the end of the adjacent bead in the position shown in Figure 16. This may be accomplished by inserting a suitable implement into the slot 116.

The outer contour of the various bead members may be formed so as to simulate a molding of any desirable shape.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. In a glazed window assembly, the combination including frame members, said frame members being provided with web portions extending along the edges of the glazing, tabs struck out from the web portions and extending parallel thereto and in spaced relation therefrom, an abutting surface disposed on a portion extending from each of the tabs to the web portions, and a wedge-shaped sheet metal member tapering from one end to the other, said sheet metal member having a flange portion extending at right angles to the main body of the sheet metal member and extending parallel to the glazing, said flange portion overlying the margin of the glazing to hold it in position, tongues offset from the plane of the main body member, said tongues having a portion extending parallel to the main body member and resiliently engaging an edge of the glazing, said tongues cooperating with the flange portion to hold the glazing in position, each of said abutting surfaces being disposed at an angle corresponding to the taper of the wedge-shaped sheet metal member overlying the tab so as to provide a wide seat against which the sheet metal member is held.

2. In a glazed window assembly, the combination including frame members, said frame members being provided with web portions extending along the edges of the glazing, tabs struck out from the web portions and extending parallel thereto and in spaced relation therefrom, the thickness of the portion of the tab extending parallel to the web portion being less than the thickness of the web, an abutting surface disposed on a portion extending from each of the tabs to the web portions, and a wedge-shaped sheet metal member tapering from one end to the other, said abutting surface on the portion extending from each of the tabs to the web portions being disposed at an angle corresponding to the taper of the sheet metal member so as to provide a wide seat against which the sheet metal member is held, said sheet metal member having a flange portion extending at right angles to the main body of the sheet metal member and extending parallel to the glazing, said flange portion overlying the margin of the glazing to hold it in position, tongues offset from the plane of the main body member, said tongues having a portion extending parallel to the main body member and resiliently engaging the edge of the glazing, said tongues cooperating with the flange portion to hold the glazing in position.

LEE D. BAYLEY.

References Cited in the file of this patent

UNITED STATES PATENTS

| Number | Name | Date |
|---|---|---|
| 1,023,479 | Wilkinson | Apr. 16, 1912 |
| 1,171,762 | Wilkinson | Feb. 15, 1916 |
| 2,114,791 | Williams | Apr. 19, 1938 |

FOREIGN PATENTS

| Number | Country | Date |
|---|---|---|
| 787,173 | France | 1935 |